United States Patent [19]

Tsuchida et al.

[11] Patent Number: 5,091,852
[45] Date of Patent: Feb. 25, 1992

[54] SYSTEM FOR OPTIMIZING QUERY PROCESSING IN A RELATIONAL DATABASE

[75] Inventors: Masashi Tsuchida, Tokyo; Kazuhiko Ohmachi, Kawasaki, both of Japan

[73] Assignee: Hitachi, Ltd., Tokyo, Japan

[21] Appl. No.: 302,307

[22] Filed: Jan. 25, 1989

[30] Foreign Application Priority Data

Jan. 29, 1988 [JP] Japan .................... 63-17071

[51] Int. Cl.⁵ ................ G06F 15/403; G06F 15/401
[52] U.S. Cl. ................ 395/600; 364/282.1;
364/283.4; 364/DIG. 1; 364/DIG. 2; 364/974;
364/974.4; 364/974.6
[58] Field of Search ... 364/200 MS File, 900 MS File

[56] References Cited

U.S. PATENT DOCUMENTS

| 4,506,326 | 3/1985 | Shaw et al. | 364/300 |
|---|---|---|---|
| 4,769,772 | 9/1988 | Dwyer | 364/300 |
| 4,774,661 | 9/1988 | Kumpati | 364/300 |
| 4,829,427 | 5/1989 | Green | 364/300 |

OTHER PUBLICATIONS

J. M. Smith and Philip Yen-Tang Chang, "Optimizing the Performance of a Relational Algebra Database Interface", CACM vol. 18, No. 18, Oct., 1975, pp. 568-579.

P. G. Selinger et al., "Access Path Selection in a Relational Database Management System", Proc. ACM-SIGMOD, 1979, pp. 23-34.

Tsuchida et al.; "Local and Gobal Query Optimizations for Relational Database"; New York Institute of Electrical and Electronics Eng. 1985; pp. 405-417.

Schkolnick et al.; "Estimating the Cost of Updates in Relational Database II"; ACM Trans. Database Syst.; vol. 10 No. 2; pp. 163-179.

Primary Examiner—Thomas C. Lee
Assistant Examiner—Krisna Lim
Attorney, Agent, or Firm—Fay, Sharpe, Beall, Fagan, Minnich & McKee

[57] ABSTRACT

A method for processing a database for analyzing a query to the database from a user to determine an internal processing procedure therefor and executing it comprises the steps of preparing single or a plurality of internal processing procedures based on analysis result of the query including a variable inputted in a preprocess step and statistical information of a database system, selecting an optimum one of the internal processing procedures based on a value substituted for the variable of the query in a query execution stage and the statistical information of the database system, and executing the query in accordance with the selected internal processing procedure.

7 Claims, 7 Drawing Sheets

SYSTEM FOR OPTIMIZING QUERY PROCESSING IN A RELATIONAL DATABASE

BACKGROUND OF THE INVENTION

The present invention relates to method and apparatus for processing a database suitable for query processing in a relational database management system.

In a database management system (DBMS), particularly a relational DBMS, a query expressed in a non-procedual language is processed and an internal processing procedure is determined and executed. Principal methods of prior art query processing include a method for determining a single internal processing procedure based on a predetermined rule (for example, Smith, J. M., et al "Optimizing the Performance of a Relational Database Interface", *CACM* Vol. 18, No. 10, Oct. 1975, pp. 568-579) and a method for determining by cost evaluation an optimum one of a plurality of candidate processing procedures selected in accordance with various statistical information (for example, Selinger, P. G., et al. "Access Path Selection in a Relational Database Management System" *Proc. ACM-SIGMOD,* 1979, pp. 23-34). In the former, a load to prepare the processing procedure is low but it has problems in a validity of a uniformly set rule and an optimization of a selected internal processing procedure. In the latter, a load to manage various statistical information, preparation of procedure for processing a plurality of candidate and cost evaluation thereof, but it provides an optimum processing procedure.

Where a query language is combined with a host language (COBOL, PL/I etc.) the query is pre-processed before the execution of an application program to prepare an internal processing procedure which is in an execution form. In a query expression, variables in the host language are frequently described in a retrieval condition expression. Those variables are substituted by constants when the internal processing procedure which is a result of the pre-processing is executed.

The database comprises a relation which appears to a user as a two-dimension table, including row and columns. The row comprises one valve from every column of the table.

In the prior art method for determining an optimum processing procedure by the cost evaluation based on a ratio of data which satisfies the retrieval condition which appears in the query, the variables appear in the retrieval condition expression in the query expression during the pre-processing. Accordingly, it is not possible to estimate the ratio of data which satisfies the retrieval condition expression so the cost evaluation cannot be attained. As a result, where the variables appear in the retrieval condition expression in the query expression, the cost evaluation is done based on a default value applied as a ratio of data which satisfies the condition expression depending on the type of retrieval condition expression, or a single internal processing procedure is prepared based on a predetermined rule. However, the resulting internal processing procedure has no clear decision criterion regarding optimization and it lacks validity.

SUMMARY OF THE INVENTION

It is an object of the present invention to provide method and apparatus for processing a database by developing an optimum internal processing procedure to one or more execution modules, and when a query is executed, the above procedure is selected and executed so that a performance of the query processing is improved.

In order to achieve the above object, the present invention comprises the steps of preparing in a preprocessing operation, an internal processing procedure which is validated by a value substituted in the execution operation even if variables are described in an input retrieval condition expression in the query expression, maintaining column value frequency information relating to a column which appears in the retrieval condition expression in the query expression, selecting an optimum one from one or more internal processing procedure based on the column value frequency information, and executing the selected internal processing procedure which has been developed into an execution module.

In the pre-processing step of the present invention, the internal processing procedure, which may be an optimum one depending on the value substituted during the execution, has been developed into the execution module. Accordingly, the processing load is reduced compared to the optimal processing of the query in the execution operation, although a memory capacity required increases. Since the column value frequency information preset for each retrieval condition expression is used to select the optimum one of a plurality of internal processing procedures in the execution stage, an input/output processing load is reduced compared to a method which refers a data structure such as an index. If it is determined based on the retrieval condition expression and the column value frequency information that the development to a plurality of internal processing procedures is not necessary depending on the input query, only one internal processing procedure is prepared in the pre-processing stage.

BRIEF DESCRIPTION OF THE DRAWINGS

FIGS. 4A to 4I show flow charts of processing in the DBMS to which the present invention is applied.

DESCRIPTION OF THE PREFERRED EMBODIMENTS

The preferred embodiments of the present invention are now explained in detail with reference to the accompanying drawings.

Figure 1:
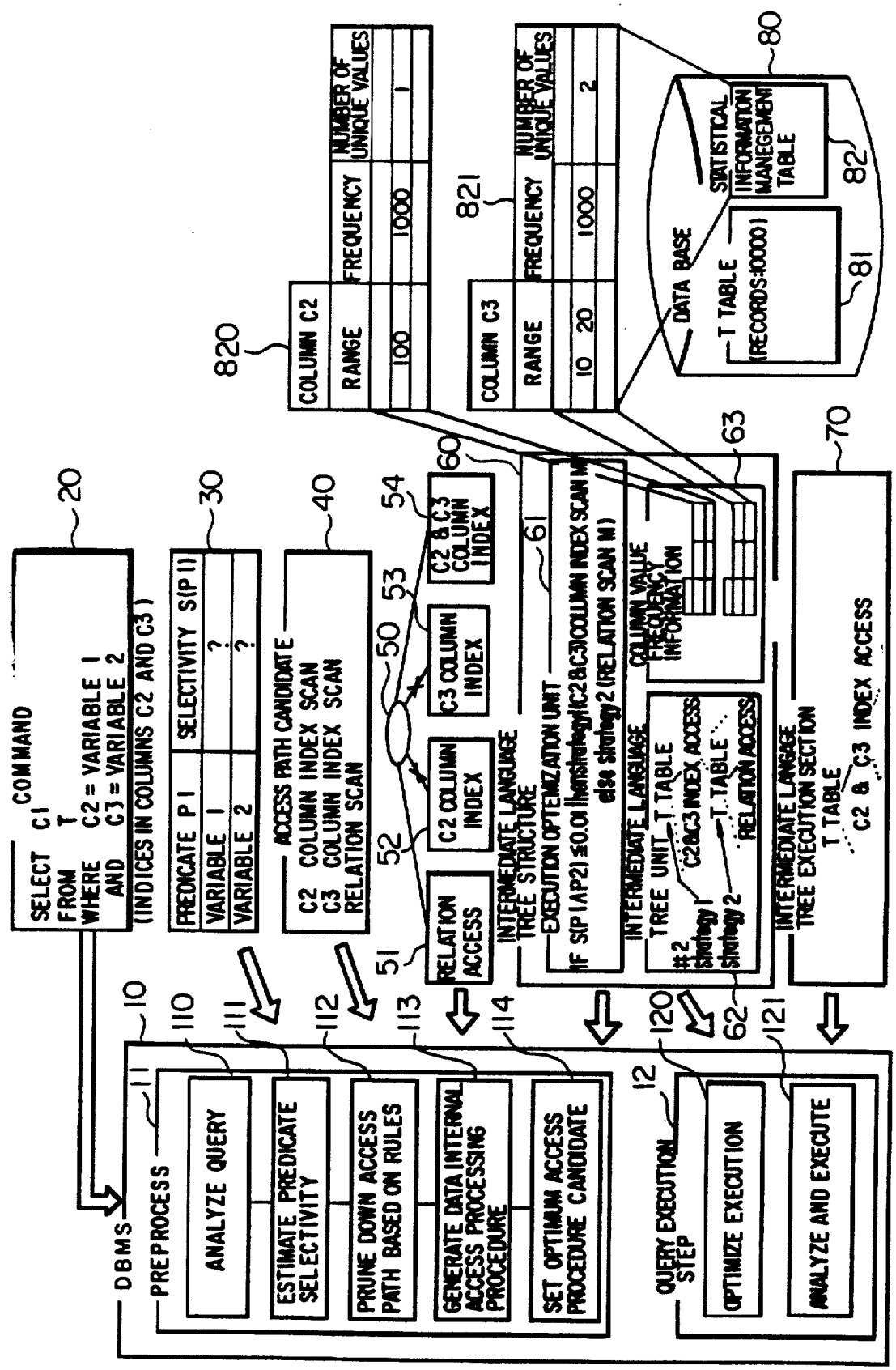
FIG. 1 shows a functional view of processing of a DBMS to which the present invention is applied.

FIG. 1 shows an example of processing function of a DBMS to which the present invention is applied. A command 20 of FIG. 1 comprises a retrieval condition expression having two selection conditions "C2=variable 1" and "C3=variable 2" coupled by a logical AND. The selection conditions "variable name 1" and "variable name 2" indicate that values are substituted in the execution stage. The command 20 is applied to a DBMS 10 to start the query processing. In order to attain the command processing to substitute the values in the execution stage, the DBMS 10 includes a preprocess step 11 which is conducted before the query execution and an execution step 12 which controls the query execution. The preprocess step 11 comprises a query analysis step 110 for performing syntax analysis and semantic analysis of an input command, a predicate selectivity estimate step 111 for estimating a ratio of data (a predicate selectivity or simply a selectivity) which meets the condition, based on various condition expressions which appear by the command, an access path prune-down step 112 for pruning down a valid access path candidate based on information of database characteristics (data sizes in the data base, a physical structure of the database, type and presence/absence of an index, etc.) and system characteristics (buffer size, CPU performance, etc.) in accordance with a predetermined rule, a data access processing procedure generation step 113 for conducting cost evaluation including the number of times of input/output and the CPU use time to prepare a candidate of the internal processing procedure, and an optimal access procedure candidate setting step 114 for developing the candidate selected in the above step into an execution module and preparing a data structure to attain a mechanism for selecting the candidate based on a substituted value in the execution stage. The query execution step 12 comprises an execution optimize step 120 for selecting an optimum internal processing procedure to be executed based on the data structure prepared in the step 114, and a decode and execute step 121 for decoding and executing the internal processing procedure selected in the above step. The database 80 contains a table 81 and a statistical information management table 82. The statistical information management table 82 contains column value frequency information which constitutes the tables of the database 80. Numeral 30 denotes a result of evaluation of the selectivity of the condition expressions appearing in the command 20. An access path candidate list 40 registers therein the access path selected in the access path prune-down step 112. Numeral 50 denotes a generated processing procedure (51, 52, 53, 54). An intermediate language tree structure 60 comprises an execution optimize unit 61, an intermediate language tree unit 62 and column value frequency information 63. The execution optimize unit 61 is a data structure which attains a mechanism to select an internal processing procedure stored in the intermediate language tree unit 62 based on the selectivity calculated from the column value frequency information 63 depending on the value substituted in the execution stage. An intermediate language tree execution section 70 is an area in which the internal processing procedure selected in the execution optimize step 120 is stored.

An example of processing of a command is now explained. It is assumed that a column value frequency relating to the column which appears in the condition expression of the command is stored in the statistical information management table 82. For example, 820 shows that there are 1000 column C2 values "100", and 821 shows that there are total of 1000 column C3 values "10" and "20" (two frequencies). The command 20 is applied to the DBMS and the preprocess step 11 is executed. In the present example, there are indices in both the column C2 and the column C3. After the syntax analysis and the semantic analysis in the query analysis step 110, the selectivity of the condition expression appearing in the command is calculated in the predicate selectivity estimate step 111. If a constant appears in each condition expression, the selectivity can be determined. In the command 20, no constant appears in either one of the selection condition expressions as shown by 30, and the selectivity cannot be determined. Then, an access path to be used in executing the input command is selected in the access path prune-down step 112. Normally, the index of the column having the smallest selectivity calculated in the step 111 is preferentially selected. In the present example, since the selectivity of the condition expressions is not determined in 30, three access paths are registered as shown in an access path candidate 40. In the data access processing generation step 113, the internal processing procedure is generated based on the access path candidate list 40. The internal processing procedure includes a "relation access" 51, a "C2 column index" 52, a "C3 column index" 53, and a "C2 & C3 column index" 54. In the optimum access procedure candidate set process 114, the intermediate language tree structure 60 is prepared. A predetermined rule is applied to a plurality of internal processing procedures 50. If the index is present in both the column C2 and the column C3, the internal processing procedure of only "relation access" 51 and "C2 & C3 column index" 54 may be selected in the execution stage. Thus, a criterion of decision based on the value substituted in the execution stage (whether the selectivity which satisfies the both selection condition expressions is no smaller than 0.01) and the internal processing procedure to be selected in accordance with the criterion are set into the execution optimize unit 61. One or more internal processing procedures in the execution module are set into the intermediate language tree 62. In order to precisely estimate the selectivity to be determined in the execution stage, the frequency information for all column values or the frequency information for some column values is extracted from the statistical information management table 82 depending on the type of condition table appearing by the command, and it is set into the column value frequency information 63. The query execution step 12 is now explained. When C2 = 100 and C3 = 10 are substituted, the execution optimize step 120 is executed. In the column C2, the value "100" appears 1000 times according to the column value frequency information 63. Thus, the selectivity for the selection condition "C2 = 100" is 1000/10000 (number of times of appearance/number of records) = 0.1. Similarly, in the column C3, the value "10" appears 1000/2 = 500 times according to the column value frequency information 63. Thus, the selectivity for the selection condition "C3 = 10" is 500/10000 = 0.05. Thus, the selectivity for simultaneous satisfaction by the both selection condition expressions, that is, "C2 = 100 AND C3 = 10" is $0.1 \times 0.05 = 0.005$, which is smaller than 0.01. As a result, the internal processing procedure in the execution module corresponding to the "C2 & C3 column index" 54 is selected. In the decode and execute step 121, the internal processing procedure in the execution module selected in the previous step is set into the intermediate language tree execution section 70 where it is decoded and executed.

Figure 2:
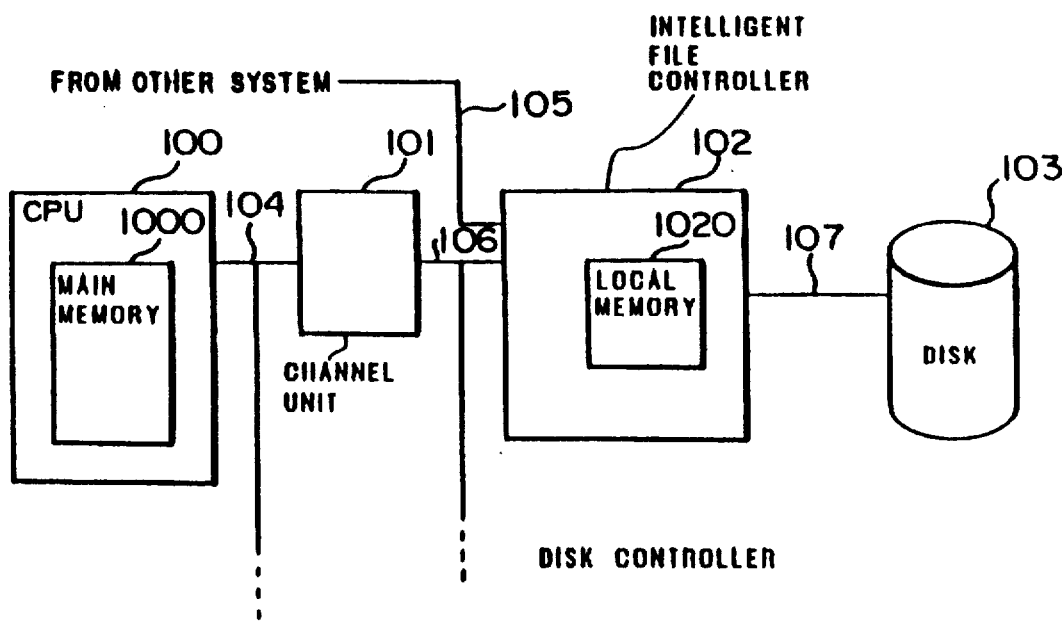
FIG. 2 shows an embodiment of a hardware configuration to which the present invention is applied.

FIG. 2 shows an embodiment of a hardware configuration to which the present invention is applied. It comprises a central processing unit (CPU) 100 having a main memory (MM) 1000, a channel unit (CHU) 101 for input/output control, an intelligent file controller (IFC) 102 having a local memory (LM) 1020 for storing data to be selected, limited, projected or coupled in the database processing, and a disk (DK) 103.

A relative block address and input/output data are transferred between the intelligent file control unit 102 and the disk 103 through a path 107. Result of filtering and retrieval condition are transferred between the channel unit 101 and the intelligent file control unit 102 through paths 105 and 106. Data are transferred and control data are exchanged between the central processing unit 100 and the channel unit 101 through a path 104. A plurality of channel units 101 and intelligent file control units 102 may be connected to the paths 104 and 106, respectively. The path 105 may be used to share the intelligent file control unit 102 with other system.

In the present system, not all database processings are executed by the DBMS 10 which is on the central processing unit 100. Of the database processing, relational algebra operations corresponding to the internal processing procedure generated in the data access processing procedure generation step 113 of the DBMS 10, that is, selection, limitation, projection and coupling operations are functionally shared by the intelligent file control unit. This corresponds to the addition of various operational functions (for example, filtering unit) to the input/output unit. A basic operation is described below.

(1) The query inputted from the application program is analyzed by the DBMS 10 to determine the processing procedure.

(2) The relational algebra operations are extracted in accordance with the above processing procedure, and an execution request is issued to the intelligent file control unit 102.

(3) The intelligent file control unit 102 decodes the execution request and issues a physical input/output request to the disk 103. The database 80 stores data in a relational form and a page which is a management unit of the database is read in synchronism with the data transfer of the disk 103 and set into a local storage 1020.

(4) The selection, limitation, projection or coupling operation is performed to the data of the local storage 1020 to filter it.

(5) The result of the processing is set into the main memory 1000 of the CPU 100.

(6) The DBMS 10 edits the result of processing and supplies the query result to the application program.

The following (1)-(5) are examples of command expressions in which the variables appear in accordance with the present invention. The variables in the commands are substituted by the constants in the query execution stage. Specifically, they appear in selection condition expression, complex condition expression, IN condition expression, BETWEEN condition expression and LIKE condition expression.

(1) Selection condition expression ($=, \neq, >, \geq, <, \leq$)
SELECT C1 FROM T WHERE C2 = variable name 1

(2) Complex condition expression (AND/OR)
SELECT C1 FROM T WHERE C2 = variable name 1
AND C3 = variable name 2

(3) IN condition expression
SELECT C1 FROM T WHERE C2 IN (variable name 1, variable name 2)

(4) BETWEEN condition expression
SELECT C1 FROM T WHERE C2 BETWEEN (variable name 1, variable name 2)

(5) LIKE condition expression
SELECT C1 FROM T WHERE C2 LIKE variable name 1

Figure 3:
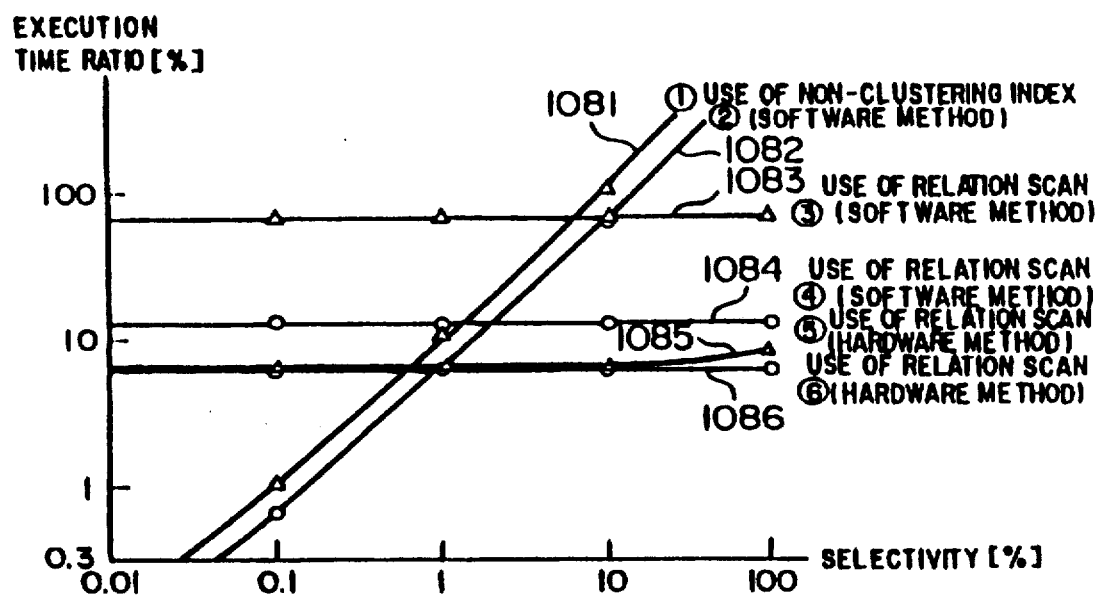
FIG. 3 shows evaluation of an access path provided by the DBMS.
Figure 4A:
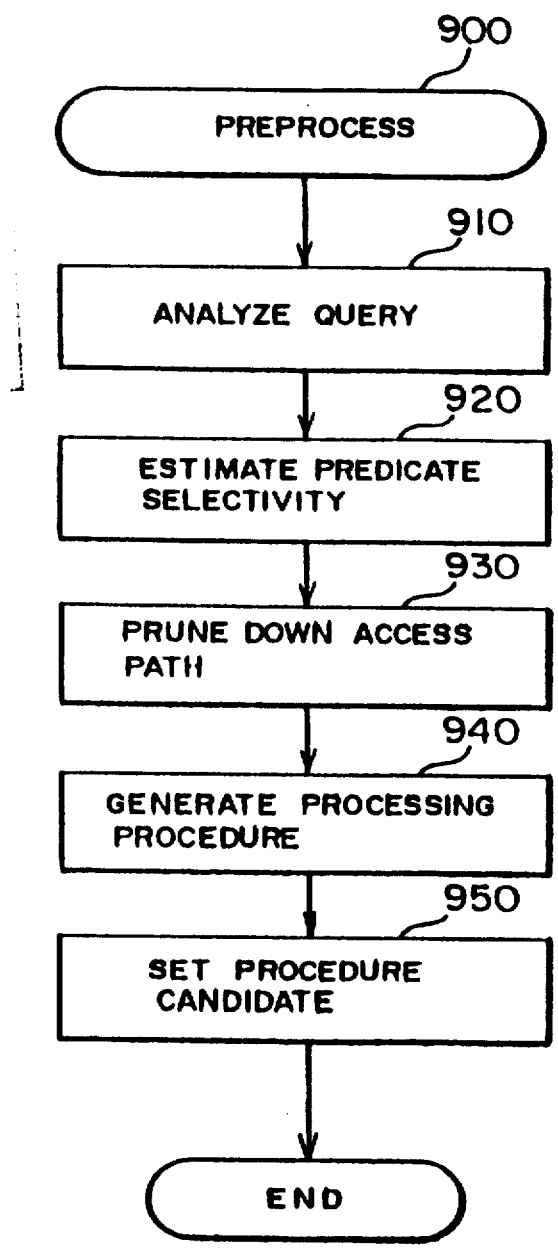
Figure 4B:
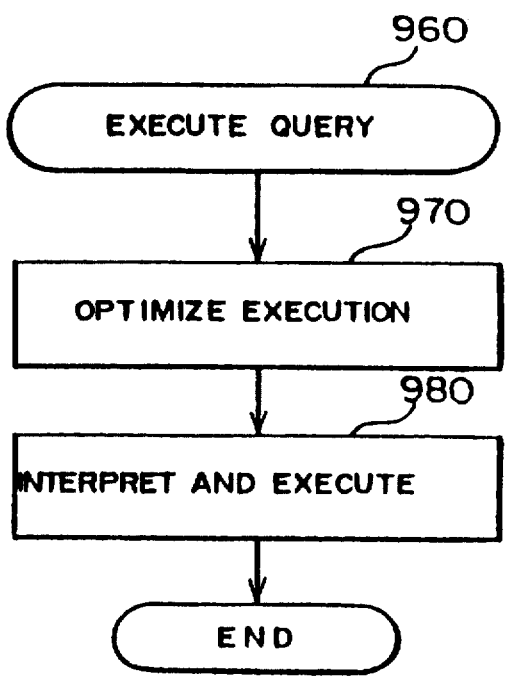
Figure 4C:
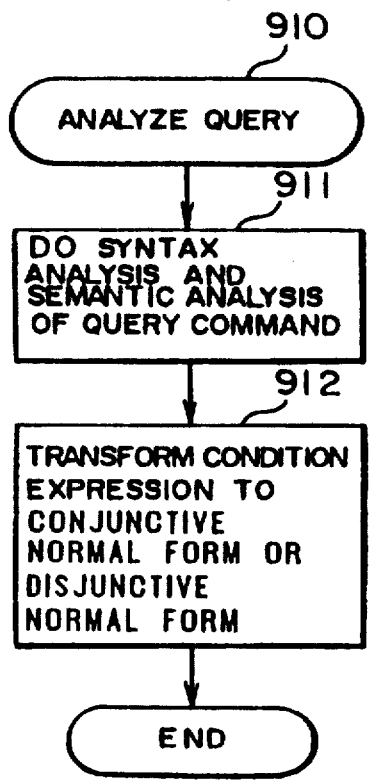
Figure 4D:
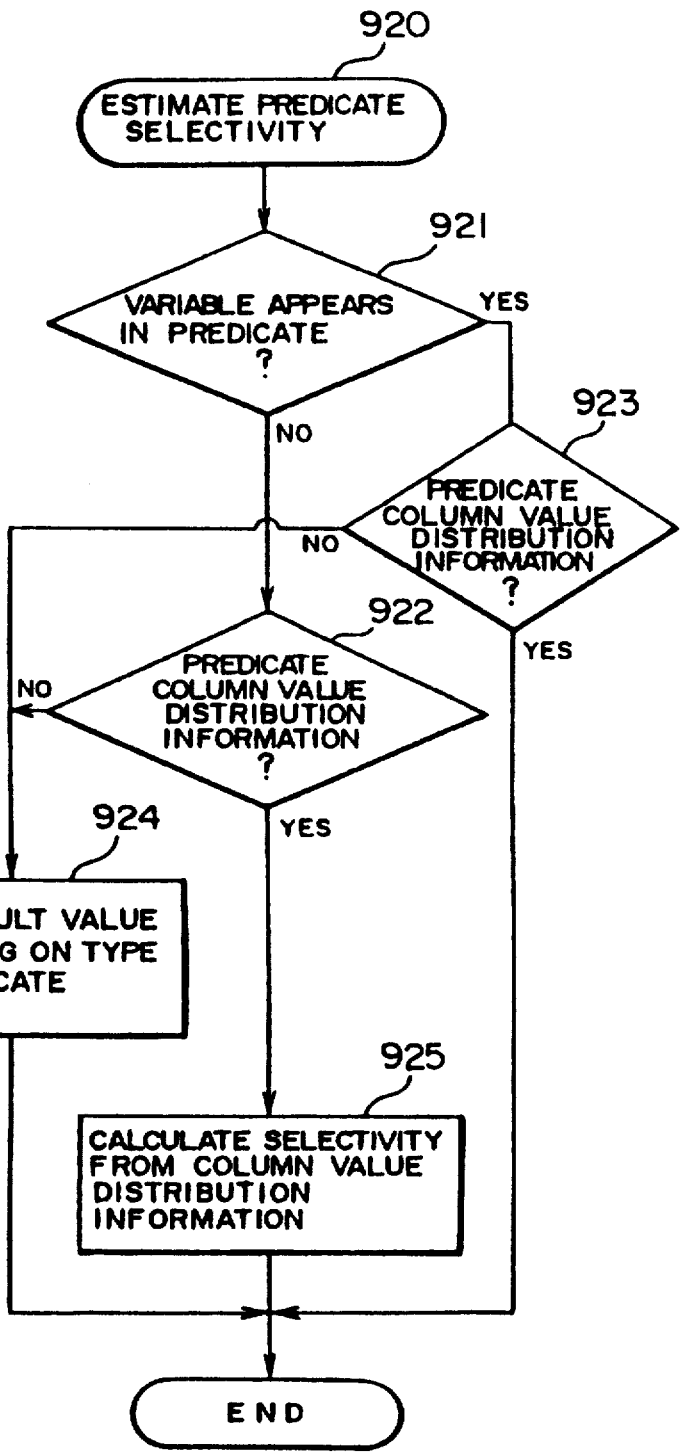
Figure 4E:
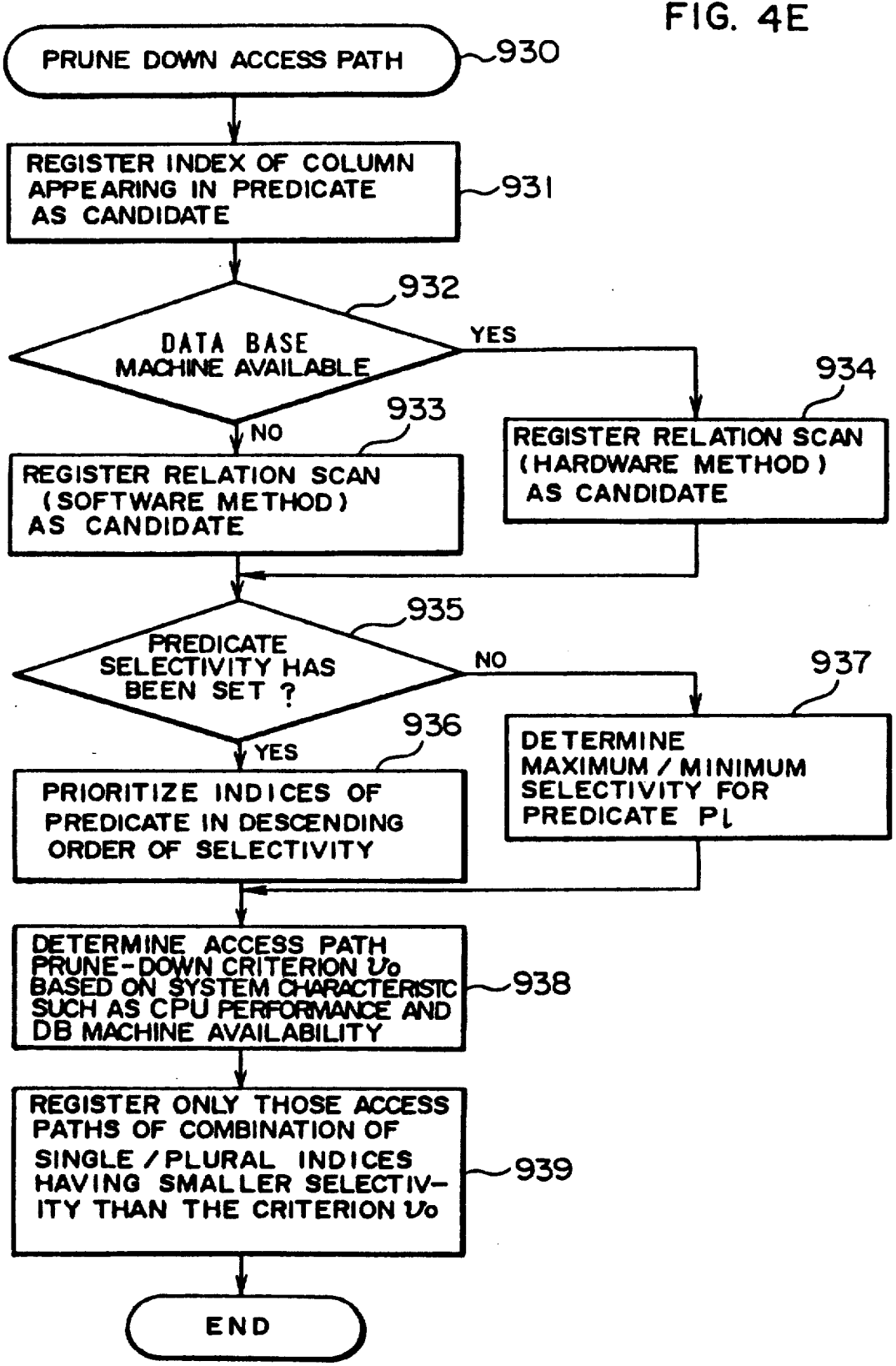
Figure 4F:
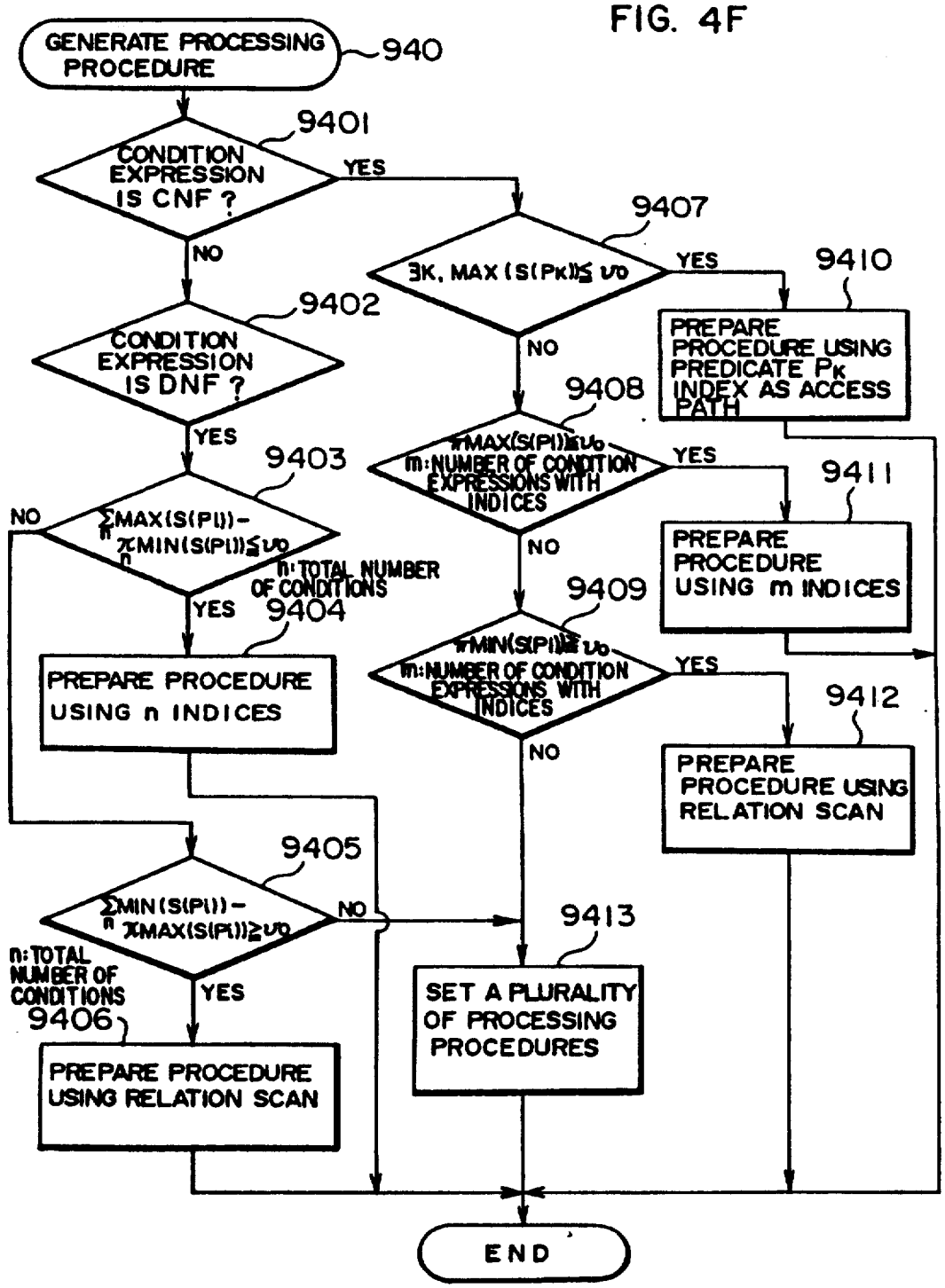
Figure 4H:
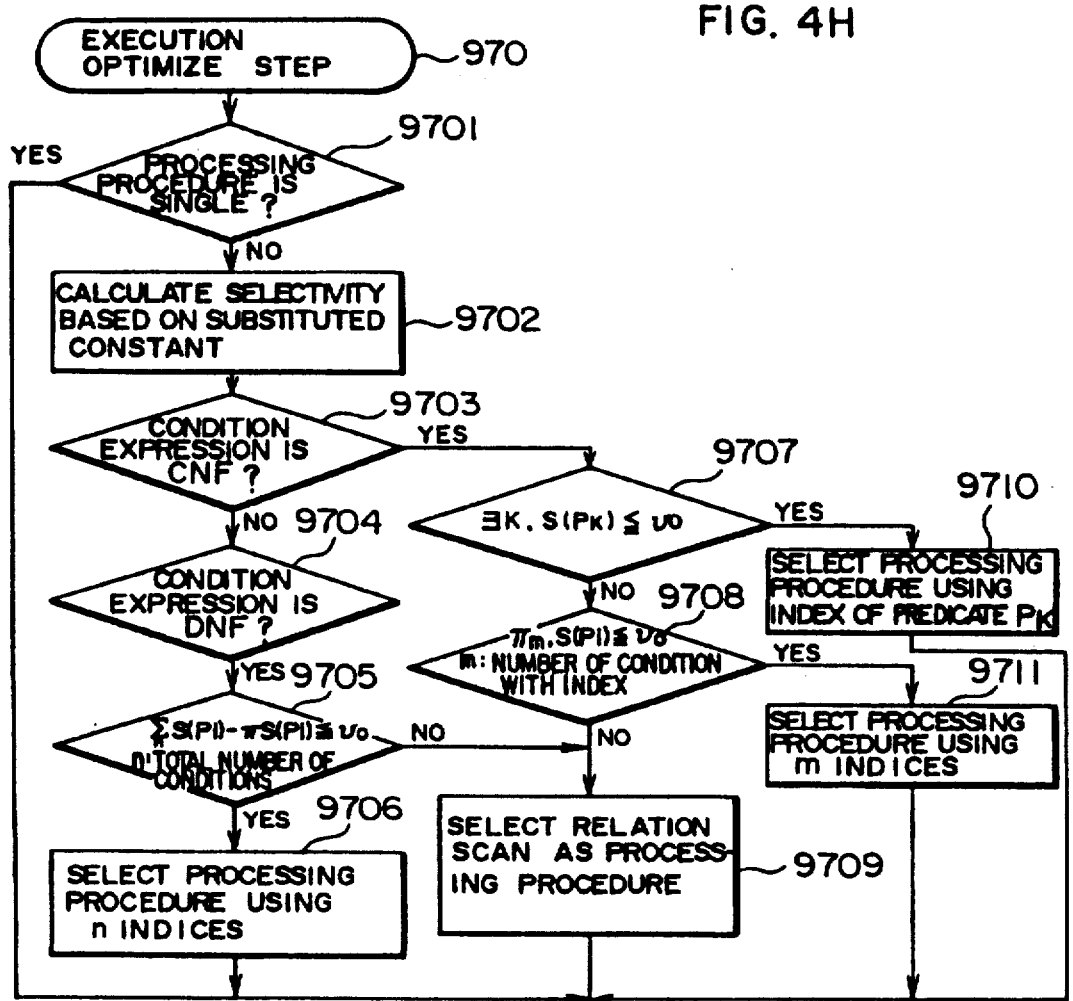
Figure 4I:
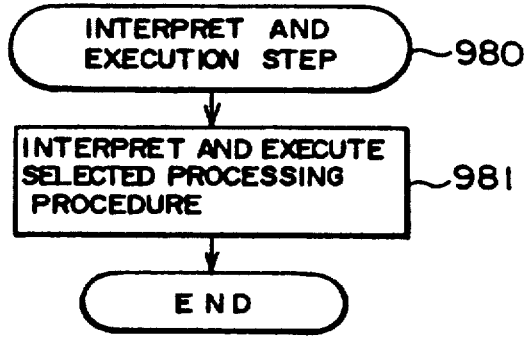

FIG. 3 shows a result when the following items are set in the access path provided by the DBMS in the system configuration of FIG. 2, and the CPU performance as a system characteristic is changed.

(1) Use of non-clustering index (software method)
(2) Use of relation scan (software method)
(3) Use of relation scan (hardware method)

An x-axis represents a selectivity and a y-axis represent a time ratio. A symbol o indicates that the CPU performance is 10 MIPS (million instructions per second), and a symbol Δ indicates that the CPU performance is 1 MIPS. Curves 1081 ① and 1082 ② are for the use of non-clustering index (software method), curves 1083 ③ and 1084 ④ are for the use of relation scan (software method), and curves 1085 ⑤ and 1086 ⑥ are for the use of relation scan (hardware method).

As a result, the following is concluded.

(1) When the DB machine is present and the CPU performance is 1 MIPS, the relation scan by the use of the DB machine is effective if the selectivity at the crosspoint of the curves 1081 ① and 1082 ⑤ is no lower than 0.5%.

(2) When the DB machine is present and the CPU performance is 10 MIPS, the relation scan by the use of the DB machine is effective if the selectivity at the crosspoint of the curves 1082 ② and 1086 ⑥ is no lower than 0.9%.

(3) When the DB machine is not present and the CPU performance is 1 MIPS, the relation scan by the software method is effective if the selectivity at the crosspoint of the curves 1081 ① and 1083 ③ is no lower than 6%.

(4) When the DB machine is not present and the CPU performance is 10 MIPS, the relation scan by the software method is effective if the selectivity at the crosspoint of the curves 1082 ② and 1084 ④ is no lower than 2%.

It is thus seen that the effective ranges of the access paths change depending on the presence or absence of the DB machine and the CPU performance. When the system characteristics and the database characteristics are given, a cost evaluation formula to uniquely determine a processing time may be determined. Thus, the application ranges of the access paths can be analytically shown. Accordingly, taking those factors into account, the access path prune-down criterion can be set as shown below.

| Rule 1: | IF $s(p) \leq 0.005$ (-DB machine present -CPU: 1 MIPS) | THEN use non-clustering index ELSE use relation scan (hardware method) |
|---|---|---|
| Rule 2: | IF $s(p) \leq 0.009$ (-DB machine present -CPU: 10 MIPS) | THEN use non-clustering index ELSE use relation scan (hardware method) |
| Rule 3: | IF $s(p) \leq 0.006$ (-DB machine not present -CPU: 1 MIPS) | THEN use non-clustering index ELSE use relation scan (software method) |
| Rule 4: | IF $s(p) \leq 0.02$ (-DB machine not present -CPU: 10 MIPS) | THEN use non-cluster index ELSE use relation scan (software method) |

The notation is explained below. In many cases, the query includes a complex condition expression having a plurality of unit condition expressions coupled by AND/OR. It is assumed that the complex condition expression is either a conjunctive normal form (CNF) or a disjunctive normal form (DNF). The following notation are used.

Pi . . . unit condition expression (selection condition expression, IN/BETWEEN/LIKE condition expression)
Λ . . . logical AND
V . . . logical OR
$\pi$ . . . direct product
$\Sigma$ . . . total sum
S(Pi) . . . selectivity of unit condition expression Pi (shown by ratio)
MAX (S(Pi)) . . . maximum one of selectivities calculated by substituting variables of predicate expression Pi by values
MIN (S(Pi)) . . . minimum one of selectivities calculated by substituting variables of predicate expression Pi by values The selectivity of the complex condition expression is evaluated by the following formula. While a method for calculating the selectivity by taking the relationship of the unit condition expressions into account has been proposed, it is difficult to attain a mechanism to grasp the relationship. It is assumed that the condition expressions are independent from each other.

$$S\left(\bigwedge_n Pi\right) = \pi_n S(Pi)$$

$$S\left(\bigvee_n Pi\right) = \sum_n S(Pi) - \pi_n S(Pi)$$

where n is the number of unit condition expressions.

In the following discussion, the access path shown in FIG. 3 is assumed. It is thus assumed that the use of index is effective if the selectivity is no higher than 1%, and the use of relation scan is effective in other cases.

FIGS. 4A to 4I show flow charts of the DBMS processing according to the present invention. The DBMS comprises a preprocess step 900 to analyze, optimize and convert to an execution module the query prior to the query execution, and a query execution step 960 to substitute the variables by the constants, select the data access processing procedure by the execution optimization and decode and execute the query.

The respective steps are described below.

(a) Preprocess step 900

(1) Query analysis step 910 . . . syntax analysis and semantic analysis of the input query command (2) Predicate selectivity estimation step 920 . . . estimation of a ratio of data (predicate selectivity or simply selectivity) which satisfy the condition based on various condition expressions appearing by the query (3) Access path prune-down step 930 . . . Pruning down of effective access path candidates based on the predetermined rule (4) Processing procedure generation step 940 . . . Cost evaluation such as number of times of input/output and CPU processing time, and generation of candidates for data access processing procedure (5) Procedure candidate setting step 950 . . . Development of the selected data access processing procedure candidates into execution modules, and generation of a data structure (intermediate language tree structure) which attains a mechanism to select one of the candidates based on the constants substituted in the execution stage.

(b) Query execution step 960

(1) Execution optimization step 970 . . . Determine the optimum data access processing procedure to be executed, by the intermediate language tree structure generated in the procedure candidate setting process, based on the constants substituted in the query execution stage, and develop the procedure into the intermediate language tree execution section.

(2) Decode and execute step 980 . . . Decode and execute the data access processing procedure determined in the execution optimization step Detailed explanations of the flow charts of the respective steps are given below.

(c) Query analysis step 910

Conduct syntax analysis and semantic analysis of the query command (step 911), and transforms the condition expressions appearing in the command into CNF or DNF (step 912).

(d) Predicate selectivity estimate step 920

Check whether a variable appears in each of the predicates appearing in the query condition expression (step 921). If it appears, check where there exist column value distribution information of the predicate and terminate the step (steps 921→923). If it does not appear, check whether there exists column value distribution information of the predicate (steps 921→922). If there exists column value distribution information, calculate a selectivity and terminate the step (steps 922→925). If there exists no column value distribution information of the predicate, set a default value predetermined depending on the type of predicate, as the selectivity (steps 922→924 and 923→924).

(e) Access path prune-down step 930

Register an index of the column appearing in each predicate appearing in the query condition expression, as a candidate (step 931). Check whether a DB machine is available (step 932). If it is available, register the relation scan (hardware method) as a candidate (step 934). If it is not available, register the relation scan (software method) as a candidate (step 933). Check whether the selectivity of each predicate has been set (step 935). If it has been set, put a priority in the descending order of the selectivity of the indices of the predicates (step 936). If it has not been set, determine possible maximum and minimum selectivities which may be assumed depending on the substituted value, for the predicate Pi (step 937). Determine the access path prune-down criterion based on the system characteristic such as CPU performance and availability of DB machine (step 938). From FIG. 3, the reference value v0 is approximately 0.01. Finally, register only those access paths which are combinations of one or more indices and have smaller selectivities than the above reference value, as candidates (step 939).

(f) Processing procedure generation step 940

It is processed in the following flow.

Case 1: Condition expression is CNF.

(i) $\exists k$, MAX (S (Pk))$\leq$0.01

⇒Prepare single data access processing procedure for selecting an index which constitute Pk as an access path (steps 9407→9410)

(ii) $\pi_m$ MAX(S (Pi)) $\leq$ 0.01

(m: number of unit condition expressions in which indices are present)
⇒Prepare single data access processing procedure which uses a plurality of indices (steps 9408→9411).

$$(iii) \underset{m}{\pi IMIN(S\ (Pi))} \geq 0.01$$

(m: number of unit condition expressions in which indices are present)
⇒Prepare single data access processing procedure which uses the relation scan (steps 9409→9412)
(iv) Other than (i), (ii) and (iii)
⇒Prepare a plurality of data access processing procedures (step 9413).
Case 2: Condition expression is DNF.

$$(i) \underset{n}{\Sigma} MAX(S\ (Pi)) - \underset{n}{\pi MIN(S\ (Pi))} \leq 0.01$$

(n: total number of unit condition expressions)
⇒Prepare single data access processing procedure which uses a plurality of indices (steps 9403→9404).

$$(ii) \underset{n}{\Sigma} MIX(S\ (Pi)) - \underset{n}{\pi MAX(S(Pi))} \geq 0.01$$

n: total number of unit condition expressions
⇒Prepare single data access processing procedure which uses the relation scan (steps 9405→9406).
(iii) Other than (i) and (ii)
⇒Prepare a plurality of data access processing procedures (step 9413).

(g) Procedure candidate setting step 950
Check whether the processing procedure is single (step 951). If it is single, develop it into an execution module (step 956). If it is not single, check whether the condition expression is a selection condition expression (=, ≠) or a LIKE condition expression (step 952). If it is, select only those column values whose number of rows which meet the condition expression as determined by the column value distribution information appearing in the condition expression exceeds 1% of the total number of rows, as the column value frequency information (step 953). If the condition expression is other than the selection condition expression (=, ≠) and the LIKE condition expression, select the original column value frequency information (step 954). Prepare the intermediate language tree structure which attains the mechanism to select the processing procedure in accordance with the constants substituted in the query execution stage (step 955), and develop the processing procedure into the execution module (step 956).

(h) Execution optimize step 970
Check whether the processing procedure is single (step 9701). If it is single, terminate the step. If it is not single, calculate the selectivity based on the constants substituted in the query execution stage (step 9702). It is processed in the following flow.
Case 1: Condition expression is DNF
(i) ∃k, S (Pk)≦0.01
⇒Select an index which constitutes Pk, as an access path (steps 9707→9710)

$$(ii) \underset{m}{\pi S(Pi)} \leq 0.01$$

(m: number of unit condition expressions in which indices are present)
⇒Select a data access processing procedure which uses a plurality of indices (steps 9708→9711)
(iii) Other than (i) and (ii)
⇒Select the relation scan as an access path (step 9709)
Case 2: Condition expression is DNF $$(i) \underset{n}{\Sigma} S\ (Pi) - \underset{n}{\pi S\ (Pi)} \leq 0.01$$

(n: total number of unit condition expressions)
⇒Select a data access processing procedure which uses a plurality of indices (steps 9705→9706)
(ii) Other than (i)
⇒Select the relation scan as an access path (step 9709)
(i) Decode and execution step 980
Decode the selected processing procedure in the execution module and execute the query command (step 981).

Through those steps, the query including the variables is executed.

The processing flows have thus been explained. The preprocess method of the present invention is applicable to not only the combination of the rule which uses the statistical information and the cost evaluation but also the DBMS which effects the optimize step such as only the cost evaluation, only the rule or the combination of the cost evaluation and the rule so long as the internal conventional procedure which provides appropriate database reference characteristic information is provided. The database reference characteristic may be automatically determined by the DBMS based on the input query or determined by the user designation (in the preprocess stage or the query execution stage). Depending on the condition expression which appear in the query, a plurality of internal processing procedures in the execution module may be developed, and if the optimum access procedure candidate setting step 114 determines that the selection of the internal processing procedure is not necessary in the query execution stage, a single internal processing procedure in the execution module is generated as it is in the conventional preprocess step. The column value frequency information need not be stored in the database but it may be stored in a data directory or a directory. Since the column value frequency may be obtained by accessing the conventional index, the column value frequency information may be set from the index. Finally, the column value frequency information may be obtained from the database, data directory, directory or index to select the internal processing procedure.

The present invention may be attained by a software system of a large scale computer or by a complex processor system having separate processors for the respective processing units.

In accordance with the present invention, for the query whose optimum internal processing procedure varies with the value substituted in the execution stage, (1) the internal processing procedure is previously developed into the execution module so that the CPU load is reduced compared to the case where the optimization is done in the execution stage, and (2) the internal processing procedure is selected based on the column value frequency information so that the optimum internal processing procedure is selected and the CPU load and the number of times of input/output are reduced.

We claim:

1. A method for processing a database comprising the steps of:
   analyzing a query including a variable in a central processing unit;
   generating, in the central processing unit, at least one internal processing procedure for executing the query based on a result of the step of analyzing a query and statistical information of a system including the database, the statistical information including
   (a) a characteristic of the database, and
   (b) a characteristic of the system including a central processing unit for issuing the query, and at least one of
      (i) frequency information of a column constituting a relation in the database, and
      (ii) information relating to a range value derived by dividing column value frequency relating to a column included in a retrieval condition expressed in the query, the column value frequency and the number of column values appearing in that range;
   selecting, in the central processing unit, one processing procedure from said at least one internal processing procedure based on a value substituted for the variable included in the query and the statistical information of the system; and
   executing, in the central processing unit, the query in accordance with the selected internal processing procedure.

2. A method for processing a database according to claim 1 wherein the statistical information of the system includes frequency information of a column value relating to a column included in a retrieval condition expressed in the query.

3. A method for processing a database comprising the steps of:
   preparing, in a central processing unit, at least one internal processing procedure which is validated, in execution of an input query, by a constant value substituted for a variable included in a retrieval condition expression of the input query, in addition to statistical information of a system including a database, the statistical information including
   (a) a characteristic of the database, and
   (b) a characteristic of the system including a central processing unit for issuing the query, and at least one of
      (i) frequency information of a column constituting a relation in the database, and
      (ii) information relating to a range value derived by dividing column value frequency relating to a column included in a retrieval condition expressed in the query, the column value frequency and the number of column values appearing in that range;
   maintaining, in a memory of the central processing unit, column value frequency information relating to a column appearing in the retrieval condition expression of the query;
   selecting, in the central processing unit, one internal processing procedure from the at least one internal processing procedure based on the column value frequency information in accordance with the constant value substituted for the variable in execution of the input query; and
   executing, in the central processing unit, the selected internal processing procedure developed into an execution module.

4. A method for processing a database comprising the steps of:
   preparing, in a central processing unit, at least one internal processing procedure for a query including a variable;
   selecting, in the central processing unit, one internal processing procedure from the at least one internal processing procedure based on a constant substituted for the variable in an execution of the query and statistical information of a database system including the database, the statistical information including
   (a) a characteristic of the database, and
   (b) a characteristic of the system including a central processing unit for issuing the query, and at least one of
      (i) frequency information of a column constituting a relation in the database, and
      (ii) information relating to a range value derived by dividing column value frequency relating to a column included in a retrieval condition expressed in the query, the column value frequency and the number of column values appearing in that range; and
   executing, in the central processing unit, the query in accordance with the selected internal processing procedure.

5. An apparatus for processing a database comprising:
   means for analyzing; in a central processing unit, a query including a variable;
   means for generating, in the central processing unit, at least one internal processing procedure based on the analysis result by the analyzing means and statistical information of a database system including the database, the statistical information including
   (a) a characteristic of the database, and
   (b) a characteristic of the system including a central processing unit for issuing the query, and at least one of
      (i) frequency information of a column constituting a relation in the database, and
      (ii) information relating to a range value derived by dividing column value frequency relating to a column included in a retrieval condition expressed in the query, the column value frequency and the number of column values appearing in that range;
   means for selecting, in the central processing unit, one internal processing procedure from at least one internal processing procedure based on a value substituted for the variable included in the query and the statistical information of the database system; and
   means for executing the query in accordance with the internal processing procedure selected by the selecting means.

6. An apparatus for processing a database according to claim 5, wherein the statistical information of the database system includes column value relating to a column included in a retrieval condition expressed in the query expression.

7. A method for processing a database comprising the steps of:

analyzing, in a central processing unit, a query including a variable;

generating, in the central processing unit, at least one internal processing procedure for executing the query based on the analysis result and statistical information of the database system including the database, the statistical information including (a) a characteristic of the database, and (b) a characteristic of the system including a central processing unit for issuing the query, and at least one of (i) frequency information of a column constituting a relation in the database, and (ii) information relating to a range value derived by dividing column value frequency relating to a column included in a retrieval condition expressed in the query, the column value frequency and the number of column values appearing in that range;

selecting, in the central processing unit, one internal processing procedure from said at least one internal processing procedure based on a designation by a user; and executing, in the central processing unit, the query in accordance with the selected internal processing procedure.

* * * * *